United States Patent
Akamine et al.

(10) Patent No.: US 11,994,577 B2
(45) Date of Patent: May 28, 2024

(54) OBJECT TRACKING DEVICE

(71) Applicant: DENSO CORPORATION, Kariya (JP)

(72) Inventors: Yusuke Akamine, Nisshin (JP); Takuya Takayama, Kariya (JP)

(73) Assignee: DENSO CORPORATION, Kariya (JP)

( * ) Notice: Subject to any disclaimer, the term of this patent is extended or adjusted under 35 U.S.C. 154(b) by 437 days.

(21) Appl. No.: 17/473,753

(22) Filed: Sep. 13, 2021

(65) Prior Publication Data

US 2021/0405177 A1   Dec. 30, 2021

Related U.S. Application Data

(63) Continuation of application No. PCT/JP2020/010328, filed on Mar. 10, 2020.

(30) Foreign Application Priority Data

Mar. 15, 2019 (JP) .................. 2019-049001

(51) Int. Cl.
*G01S 13/58* (2006.01)
*G01S 7/35* (2006.01)
*G01S 13/60* (2006.01)

(52) U.S. Cl.
CPC ............ *G01S 13/583* (2013.01); *G01S 7/352* (2013.01); *G01S 13/60* (2013.01)

(58) Field of Classification Search
CPC ......... G01S 13/583; G01S 7/352; G01S 13/60
See application file for complete search history.

(56) References Cited

U.S. PATENT DOCUMENTS

2017/0115386 A1   4/2017   Morinaga et al.

OTHER PUBLICATIONS

K. Li. "Multitarget Tracking with Doppler Ambiguity", IEEE Transactions on Aerospace and Electronic Systems vol. 49, No. 4 Oct. 2013 (Year: 2013).*
Li et al., Multitarget Tracking with Doppler Ambiguity, IEEE Transactions on Aerospace and Electronic Systems, vol. 49, No. 4, Oct. 2013, pp. 2640-2656.

* cited by examiner

*Primary Examiner* — Timothy A Brainard
*Assistant Examiner* — Helena H Seraydaryan
(74) *Attorney, Agent, or Firm* — MASCHOFF BRENNAN

(57) ABSTRACT

In an object tracking device, a candidate generator is configured to, given $P=Kmax-Kmin+1$ that defines a range of foldings of velocity by phase rotation from $Kmin^{th}$ to $Kmax^{th}$ foldings, calculate P velocity estimates for each of initial observation points. The candidate generator sets the number of foldings Kmin and the number of foldings Kmax such that $Kmin<0$ and $|Kmin|>|Kmax|$ when an absolute value of an observation angle representing a direction of the observation point is equal to or less than a first threshold value, and $Kmax>0$ and $|Kmin|<|Kmax|$ when the absolute value of the observation angle is greater than a second threshold. A velocity determiner is configured to, for each set of candidate targets, select one of the candidate targets belonging to the set of candidate targets, thereby determining the velocity of a target associated with the initial observation point.

8 Claims, 13 Drawing Sheets

FIG.6
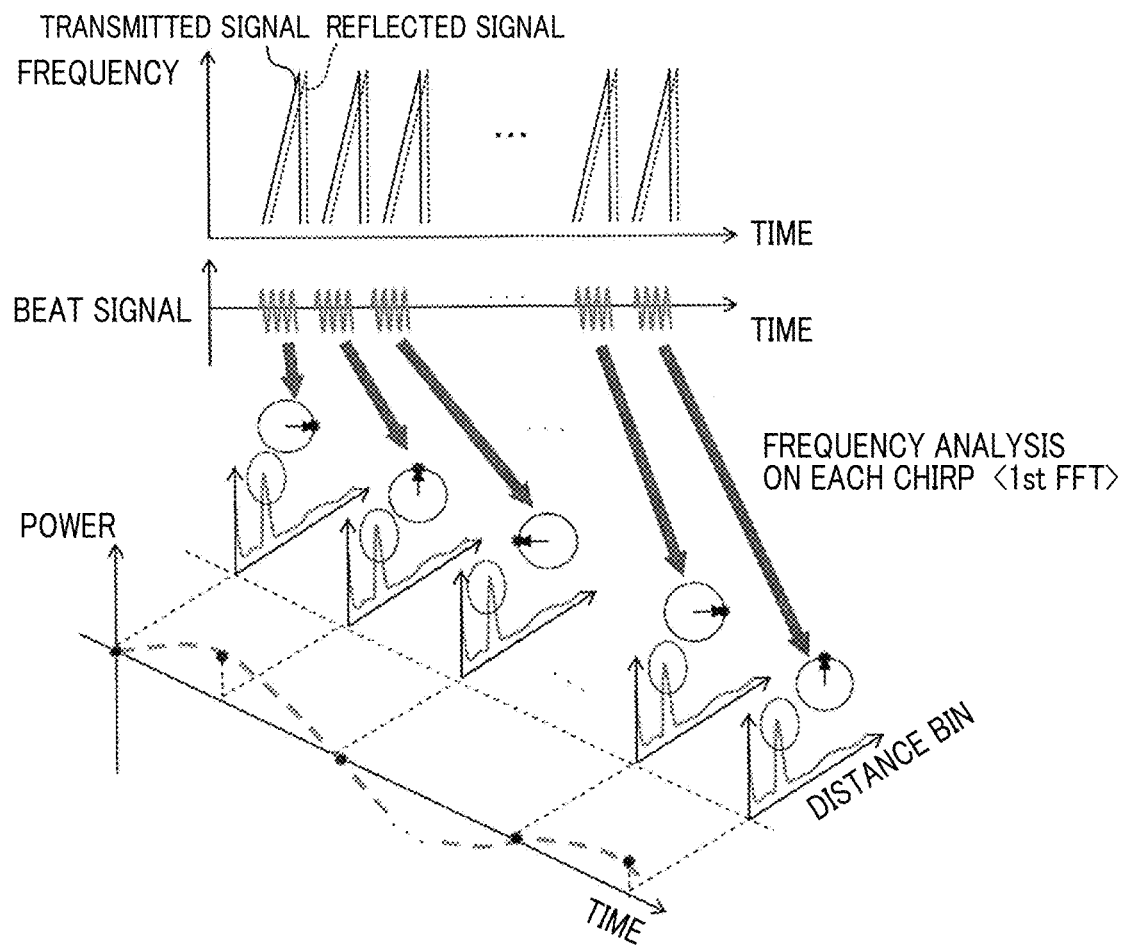
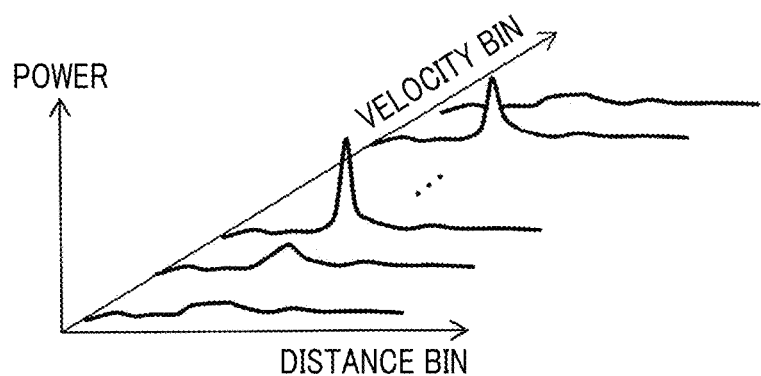

FIG.8
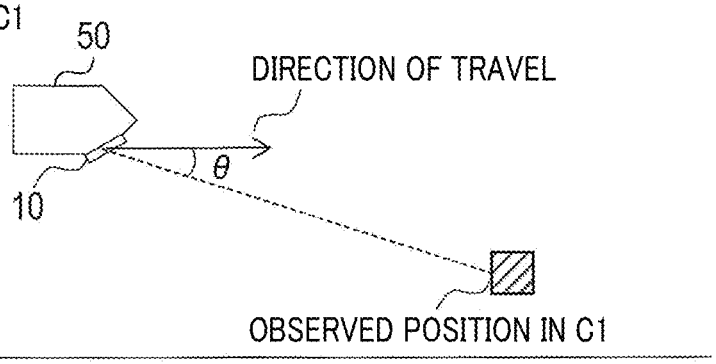
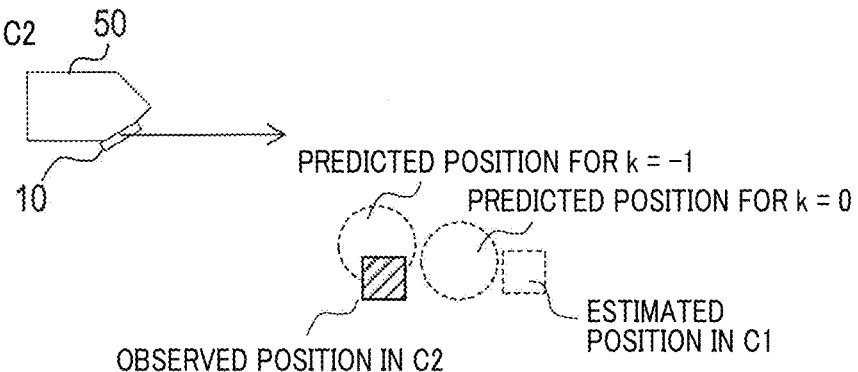

FIG.9
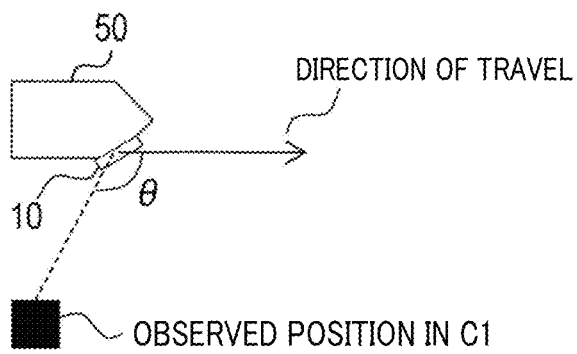
PROCESSING CYCLE C1
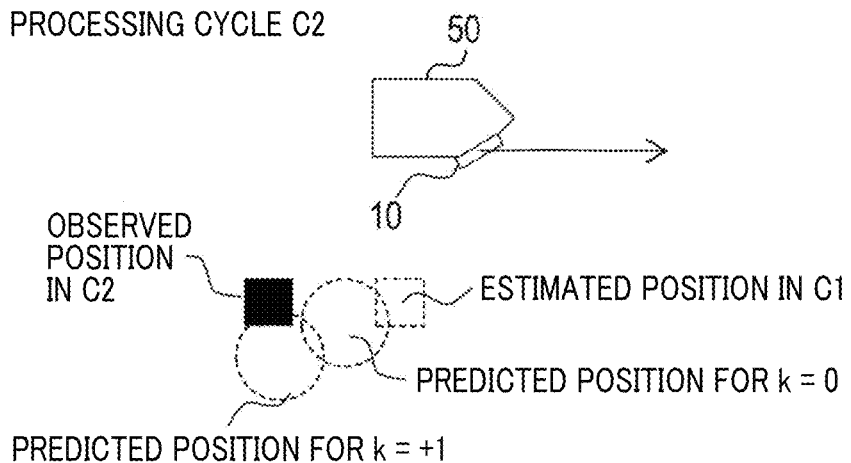
PROCESSING CYCLE C2

US 11,994,577 B2

OBJECT TRACKING DEVICE

CROSS-REFERENCE TO RELATED APPLICATION

This international application claims the benefit of priority from Japanese Patent Application No. 2019-049001 filed with the Japan Patent Office on Mar. 15, 2019, the entire contents of which are incorporated herein by reference.

BACKGROUND

Technical Field

The present disclosure relates to a technique for velocity estimation in a radar scheme having ambiguity in velocity detection.

Related Art

A known FCM radar device measures a distance to a target and a velocity of the target by using chirp signals whose frequencies continuously increase or decrease as radar signals and applying a two-dimensional FFT to a beat signal generated from transmitted and received chirp signals. FCM is an abbreviation for Fast Chirp Modulation. In the FCM radar device, a distance to the target is acquired from a frequency of the beat signal, and a relative velocity of the target is acquired from a phase rotation of the continuously detected frequency components for the same target.

BRIEF DESCRIPTION OF THE DRAWINGS

In the accompanying drawings:

FIG. 6 is an illustration of an overview of 2D FFT;

FIG. 8 is an illustration of predicted positions in the next processing cycle of candidate targets generated from an initial observation point in a case where the initial observation point is located in the direction of travel of the vehicle, for the number of foldings k=0, −1;

FIG. 9 is an illustration of predicted positions in the next processing cycle of candidate targets generated from an initial observation point in a case where the initial observation point is located in the opposite direction from the direction of travel of the vehicle, for the number of foldings k=0, −1;

DESCRIPTION OF SPECIFIC EMBODIMENTS

Figure 1A:
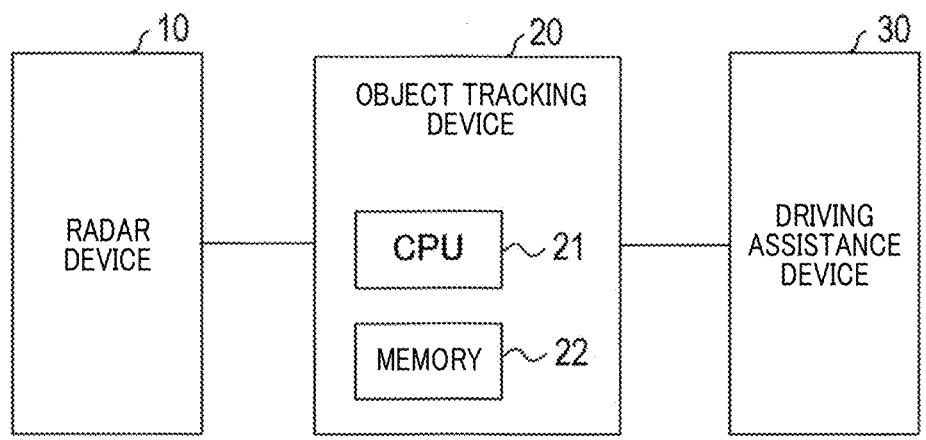
FIG. 1A is a block diagram of a driving assistance system.

In the above known FCM radar device, the detected phase θ may have been folded, and the actual phase may be θ+2n×k, with the number of foldings k being an integer. That is, the velocity acquired from the phase rotation may contain ambiguity. Thus, the relative velocity can not be determined. Such ambiguity in velocity also occurs in radar devices that use pulse signals as radar signals.

A technique is known for determining the actual velocity by tracking candidate targets with different velocities generated assuming such velocity ambiguity, as described in K. Li et al., "Multitarget Tracking with Doppler Ambiguity", IEEE Transactions on Aerospace and Electronic Systems, vol. 49, no. 4, October, 2013. In this conventional technique, a likelihood is calculated for each hypothesis, and the actual velocity is determined by selecting the hypothesis with the highest likelihood.

However, as a result of detailed research performed by the present inventors, the following issue has been found in the conventional technology described above. That is, it is necessary to expand a set range of the number of foldings for reliable detection, but the calculation load increases as the set range is expanded. In addition, in case the set range of the number of foldings is narrowed to reduce the calculation load, the object may fail to be tracked and thus recognized if the actual velocity is not included in the set range.

One aspect of the present disclosure may provide a technique for suppressing the computational load and improving the estimation accuracy when estimating the actual velocity from the detection result of the velocity with ambiguity.

One aspect of the present disclosure provides an object tracking device including a signal acquirer, a detector, a connection determiner, a candidate generator, and a velocity determiner.

A signal acquirer is configured to acquire a signal every preset processing cycle from a radar device that is mounted to a moving object and uses a modulation scheme for detecting a velocity from a phase change of the signal. A detector is configured to detect, from the signal acquired by the signal acquirer, a relative velocity and an azimuth of each of observation points that reflected a transmitted wave. A connection determiner is configured to determine, for each of current observation points which are the observation points detected by the detector in a current processing cycle, whether there is a historical connection between the current observation point and each of candidate targets generated based on the observation point detected until a previous processing cycle. A candidate generator is configured to, given a number of foldings Kmin and a number of foldings Kmax that are integers, and P=Kmax−Kmin+1 that defines a range of foldings of velocity by phase rotation from Kminth to Kmaxth foldings, calculate P velocity estimates for each of initial observation points that are the current observation points determined by the connection determiner to have no historical connection with the candidate targets, and generate, from the initial observation point, a set of candidate targets having different relative velocity estimates. A velocity determiner is configured to, for each set of candidate targets generated by the candidate generator, select one of the candidate targets belonging to the set of candidate targets, based on at least a result of determination made by the connection determiner, thereby determining the velocity of a target associated with the initial observation point.

The relative velocity of the observation point is set such that the relative velocity in a direction of approaching the moving object is negative and the relative velocity in a direction of moving away from the moving object is positive. The candidate generator is configured to set, for each of the observation points, the number of foldings Kmin and the number of foldings Kmax such that Kmin<0 and |Kmin|>|Kmax| when an absolute value of an observation angle representing a direction of the observation point relative to the direction of travel of the moving object is equal to or less than a preset first threshold value, and Kmax>0 and |Kmin|<|Kmax| when the absolute value of the observation angle is greater than a second threshold that is set equal to or greater than the first threshold value.

With this configuration, a range of the assumed number of foldings can be set appropriately, which can suppress an increase in calculation load and improve the estimation accuracy of the velocity of the object represented by the observation point.

That is, in the object tracking device of the present disclosure, the relative velocity of an object approaching the moving object is set to be negative, and the relative velocity of an object moving away from the moving object is set to be positive. Therefore, a stationary object located in the direction of travel of the moving object has a negative relative velocity, and a stationary object located in the opposite direction from the direction of travel of the moving object has a positive relative velocity. The relative velocities of objects detected using the radar are distributed around the relative velocity of the stationary object. Therefore, when the observation angle is equal to or less than the first threshold, a range of the number of foldings is biased toward the negative side, and when the observation angle is less than the second threshold, the range of the number of foldings is biased toward the positive side, such that an appropriate range of the number of foldings can be set.

Another aspect of the present disclosure provides an object tracking device including a signal acquirer, a detector, a connection determiner, a candidate generator, a likelihood setter, and a velocity determiner.

A signal acquirer is configured to acquire a signal every preset processing cycle from a radar device that is mounted to a moving object and uses a modulation scheme for detecting a velocity from a phase change of the signal. A detector is configured to detect, from the signal acquired by the signal acquirer, a relative velocity and an azimuth of each of observation points that reflected a transmitted wave. A connection determiner is configured to determine, for each of current observation points which are the observation points detected by the detector in a current processing cycle, whether there is a historical connection between the current observation point and each of candidate targets generated based on the observation point detected until a previous processing cycle. A candidate generator is configured to, given a number of foldings Kmin and a number of foldings Kmax that are integers, and P=Kmax−Kmin+1 that defines a range of foldings of velocity by phase rotation from Kminth to Kmaxth foldings, calculate P velocity estimates for each of initial observation points that are the current observation points determined by the connection determiner to have no historical connection with the candidate targets, and generate, from the initial observation point, a set of candidate targets having different relative velocity estimates. A likelihood setter is configured to set, for each set of candidate targets generated by the candidate generator, an initial value of likelihood representing certainty for each of the velocity estimates of the respective candidate targets belonging to the set of candidate targets. A velocity determiner is configured to, for each set of candidate targets generated by the candidate generator, update the likelihoods based on a result of determination made by the connection determiner, and select one of the candidate targets belonging to the set of candidate targets based on at least the likelihoods, thereby determining the velocity of a target associated with the initial observation point.

The relative velocity of the observation point is set such that the velocity in the direction of approaching the moving object is negative and the velocity in the direction of separation from the moving object is positive. The velocity determiner is configured to update the likelihoods according to the result of determination made by the connection determiner and select the one of the candidate targets according to the updated likelihoods. The likelihood setter is configured to, given that a sum of the likelihoods assigned to the velocity estimates for which the number of foldings is negative is a negative-side total likelihood and a sum of the likelihoods assigned to the velocity estimates for which the number of foldings is positive is a positive-side total likelihood, set the initial values of the likelihoods such that when an absolute value of an observation angle representing a direction of the observation point relative to the direction of travel of the moving object is equal to or less than a preset first threshold value, the negative-side total likelihood is higher than the positive-side total likelihood, and when the absolute value of the observation angle is greater than a second threshold that is set equal to or greater than the first threshold value, the positive-side total likelihood is higher than the negative-side total likelihood.

With this configuration, the likelihood of the velocity estimate is set appropriately, which can improve the estimation accuracy of the velocity of the object represented by the observation point.

That is, the number of foldings for the stationary object located in the direction of travel of the moving object becomes negative, and the number of foldings for the stationary object located in the opposite direction from the direction of travel of the moving object becomes positive. Thus, a hypothesis of the velocity estimate having a relative velocity close to that of the stationary object is more readily adopted.

Exemplary embodiments of the present disclosure will now be described with reference to the drawings.

1. Overall Configuration

The driving assistance system 1 illustrated in FIG. 1A includes radar devices 10, an object tracking device 20, and a driving assistance device 30.

Each radar device 10 is a FCM millimeter-wave radar that transmits and receives chirp signals.

Figure 2:
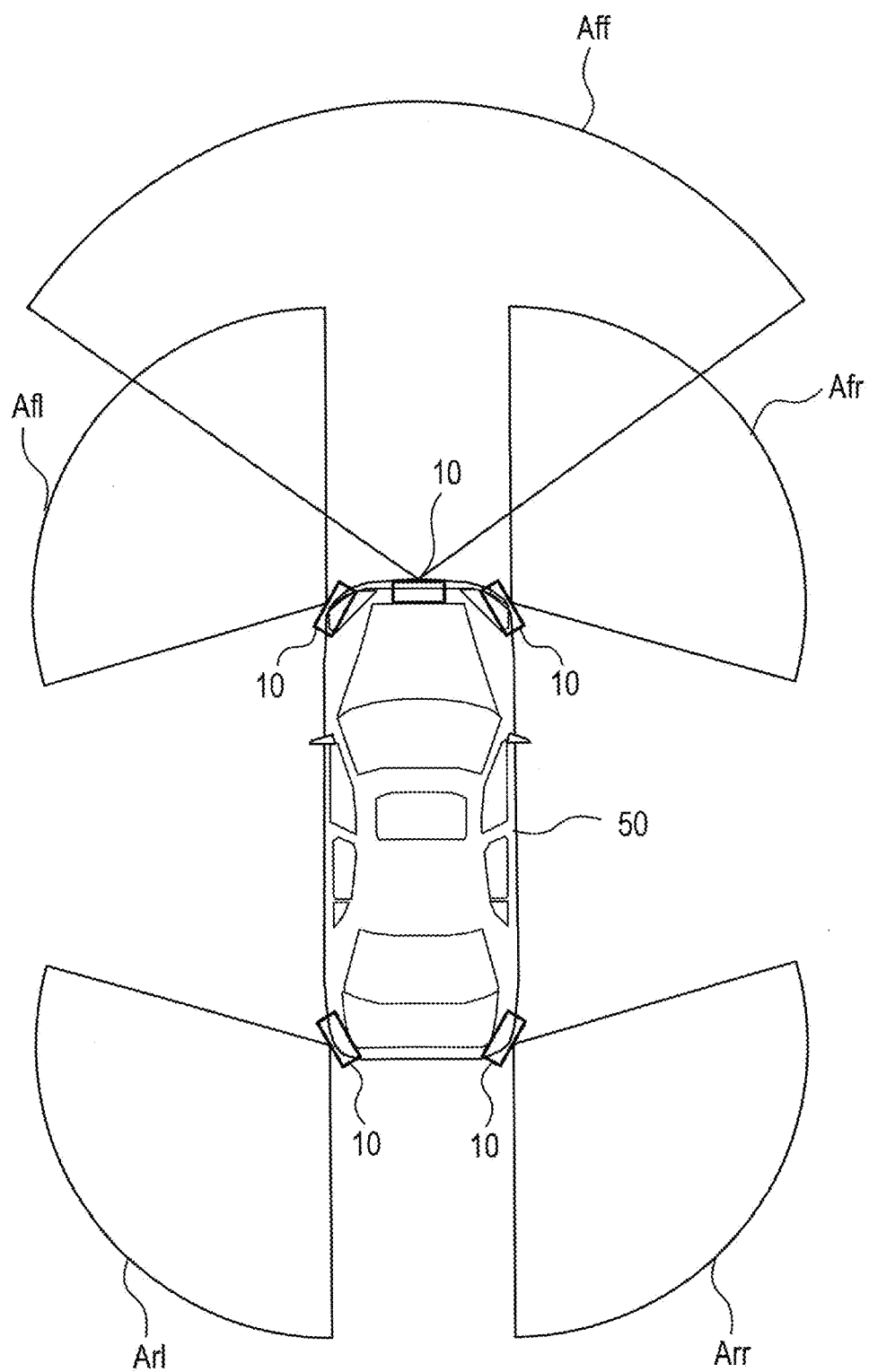
FIG. 2 is an example of installation positions and detection ranges of radar devices in a vehicle.

As illustrated in FIG. 2, a first radar device 10 may be mounted at the front center of the vehicle 50 (e.g., at the center of the front bumper), and a front center area of the vehicle 50 may be used as a detection area Aff. A second radar device 10 and a third radar device 10 may be mounted on the left front side and right front side of the vehicle 50 (e.g., at the left end and the right end of the front bumper), respectively, and left front and right front areas of the vehicle 50 may be detection areas Afl and Afr, respectively. A fourth radar device 10 and a fifth radar device 10 may be mounted on the left rear side and right rear side of the vehicle 50 (e.g., at the left end and right end of the rear bumper), respectively, and left rear and right rear areas of the vehicle 50 may be detection areas Arl and Arr, respectively.

It is not necessary that all of these five radar devices 10 are mounted to the vehicle 50. In an alternative embodiment, only one of them, or more than one of them may be mounted to the vehicle 50.

Figure 3:
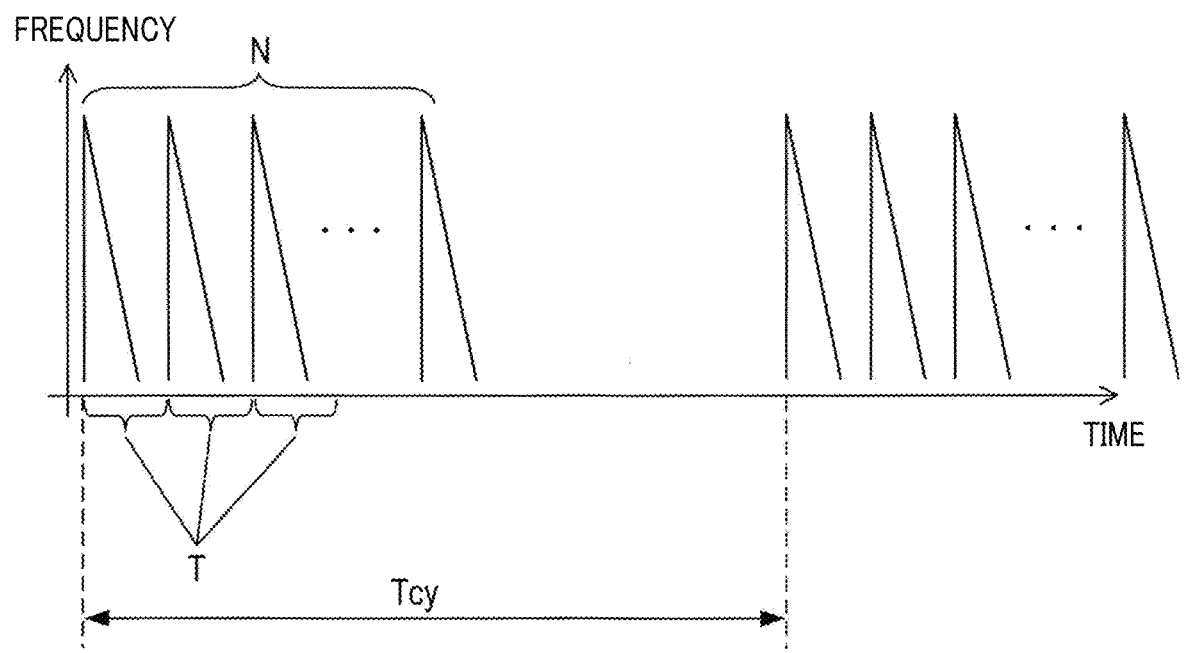
FIG. 3 is a waveform of a transmitted signal.

The chirp signal is a radar signal that is frequency modulated such that the frequency changes in a sawtooth wave pattern, as illustrated in FIG. 3. That is, the chirp signal is a radar signal whose frequency increases or decreases continuously. Though FIG. 3 illustrates chirp signals whose frequency continuously decreases, chirp signals, in an alternative embodiment, may be used whose frequency continuously increases. A time period between the start of transmission of one chirp signal and the start of transmission of the next chirp signal is a repetition period T of the chirp signal.

Each radar device 10 includes a transmitting array antenna formed of a plurality of antenna elements, and transmits a chirp signal repeatedly for a preset number of times N every repetition period T in each processing cycle of a certain period Tcy. The radar device 10 includes a receiving array antenna formed of a plurality of antenna elements, and receives a reflected signal generated in response to reflection of each transmitted chirp signal from the target. The radar device 10 further generates a beat signal by mixing the transmitted chirp signal and the reflected signal, samples the beat signal, and supplies it to the object tracking device 20. The repetition period T and the period Tcy of the processing cycle may be configured to be arbitrarily changed.

The maximum detectable velocity Vmax based on the chirp signals is expressed by the following equation (1), where the velocity of light is c and the center frequency of the chirp signal is fc.

$$V\max = c/(4 \times fc \times T) \quad (1)$$

Figure 4:
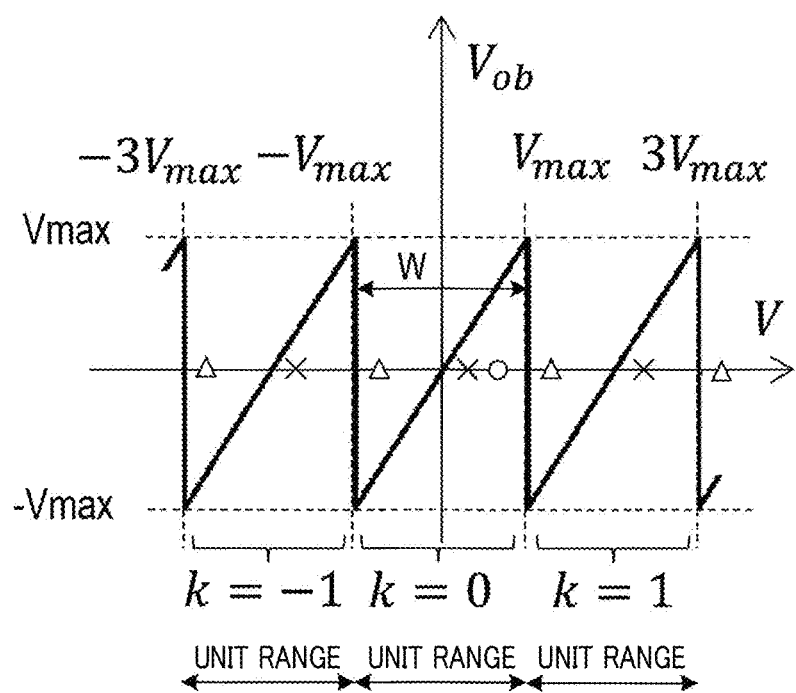
FIG. 4 is a graph illustrating a relationship between the velocity observation, the number of foldings, and the actual velocity.

The maximum detectable velocity Vmax is the maximum magnitude of the velocity V (i.e., the relative velocity to the vehicle 50) that can be detected without folding. Given that the actual velocity V is within a range of $-V\max < V < V\max$, an observed velocity Vob detected from the beat signal acquired by transmitting and receiving the chirp signals matches the actual velocity V. The number of foldings is herein denoted by k, where k is an integer. As illustrated in FIG. 4, provided that the actual velocity V is within a velocity range of $(2k-1)V\max < V < (2k+1)V\max$, the observed velocity Vob is detected as a value within the velocity range of $-V\max < V\text{ob} < V\max$. The velocity range of $(2k-1)V\max < V < (2k+1)V\max$ determined by k is hereinafter referred to as a unit range.

Returning to FIG. 1A, the object tracking device 20 is configured as a microcomputer including a a central processing unit (CPU) 21 and a semiconductor memory (hereinafter referred to as a memory) 22, such as a read-only memory (ROM), a random-access memory (RAM) and the like. The object tracking device 20 performs a process of generating, based on a result of detection by the radar device 10, information about targets present around the vehicle, that is, subject information which is information for understanding a situation around the vehicle 50. The details of this process will be described later.

The driving assistance device 30 implements various types of driving support by controlling the vehicle 50 using the subject information generated by the object tracking device 20 and information representing at least one of a state and a behavior of the vehicle 50 acquired from various sensors mounted to the vehicle 50. The driving support to be implemented includes, for example, lane distance control (i.e., ACC), lane keeping assist (i.e., LKA), lane change assist (i.e., LCA), lane departure warning, overtaking assist, intervention control, automatic braking, and automatic driving, at least one of which is included. ACC is an abbreviation for Auto Cruise Control, LKA is an abbreviation for Lane Keeping Assist, and LCA is an abbreviation for Lane Change Assist.

2. Process

Figure 5:
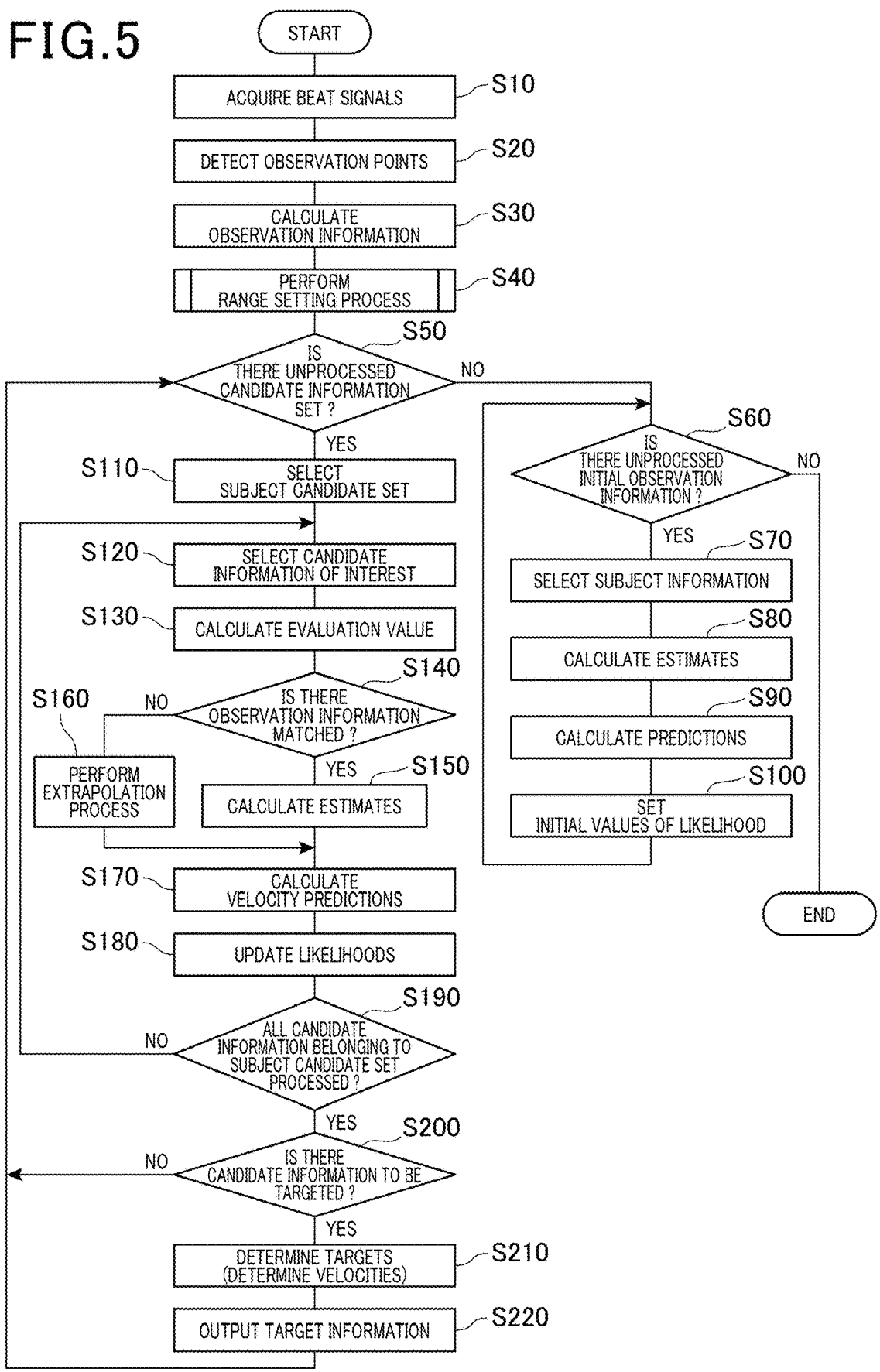
FIG. 5 is a flowchart of a process of determining a velocity of a target.

The process performed by the object tracking device 20 will now be described with reference to the flowchart in FIG. 5. This process is repeatedly performed every processing cycle of period Tcy.

First, at S10, the object tracking device 20 acquires sampling data of beat signals (hereinafter referred to as beat signals) from the radar device 10. Specifically, N beat signals are acquired from N chirp signals included in one processing cycle.

At subsequent S20, the object tracking device 20 detects an observation point indicating the presence of an object reflecting the chirp signals from the beat signals acquired at S10. As illustrated in FIG. 6, the object tracking device 20 performs FFT processing on each of the N acquired beat signals to calculate the N distance spectra. Each distance spectrum is a spectrum that represents power against distance. Since the beat signal has a frequency component corresponding to the distance to the object, each frequency BIN of the calculated distance spectrum corresponds to a distance BIN. Furthermore, the object tracking device 20 performs FFT processing on each distance BIN of the calculated N distance spectra to calculate a distance-velocity spectrum. The distance-velocity spectrum is a two-dimensional spectrum that represents the power against distance and velocity. The object tracking device 20 searches for the peak velocity BIN and distance BIN from the calculated distance-velocity spectrum and extracts the peak. The signal component corresponding to the extracted peak includes information about the observation point.

At subsequent S30, the object tracking device 20 calculates a velocity observation Vob and a distance observation (or observed distance) Rob of the object indicated by the observation point from the peak velocity BIN and distance BIN extracted at S20. The object tracking device 20 further calculates an azimuth observation (or observed azimuth) θ that indicates an azimuth of the observation point relative to the vehicle 50, by applying an arrival direction estimation algorithm to the observation point. The azimuth observation θ corresponds to an observation angle. The azimuth observation θ may be expressed, for example, as positive for the right direction and negative for the left direction relative to the straight travel direction of the vehicle 50 (i.e., 0°). In the following, the velocity observation Vob, the distance observation Rob, and the azimuth observation θ are collectively referred to as observation information.

At subsequent S40, a range setting process is performed to set a velocity folding range for each piece of observation information.

Figure 7:
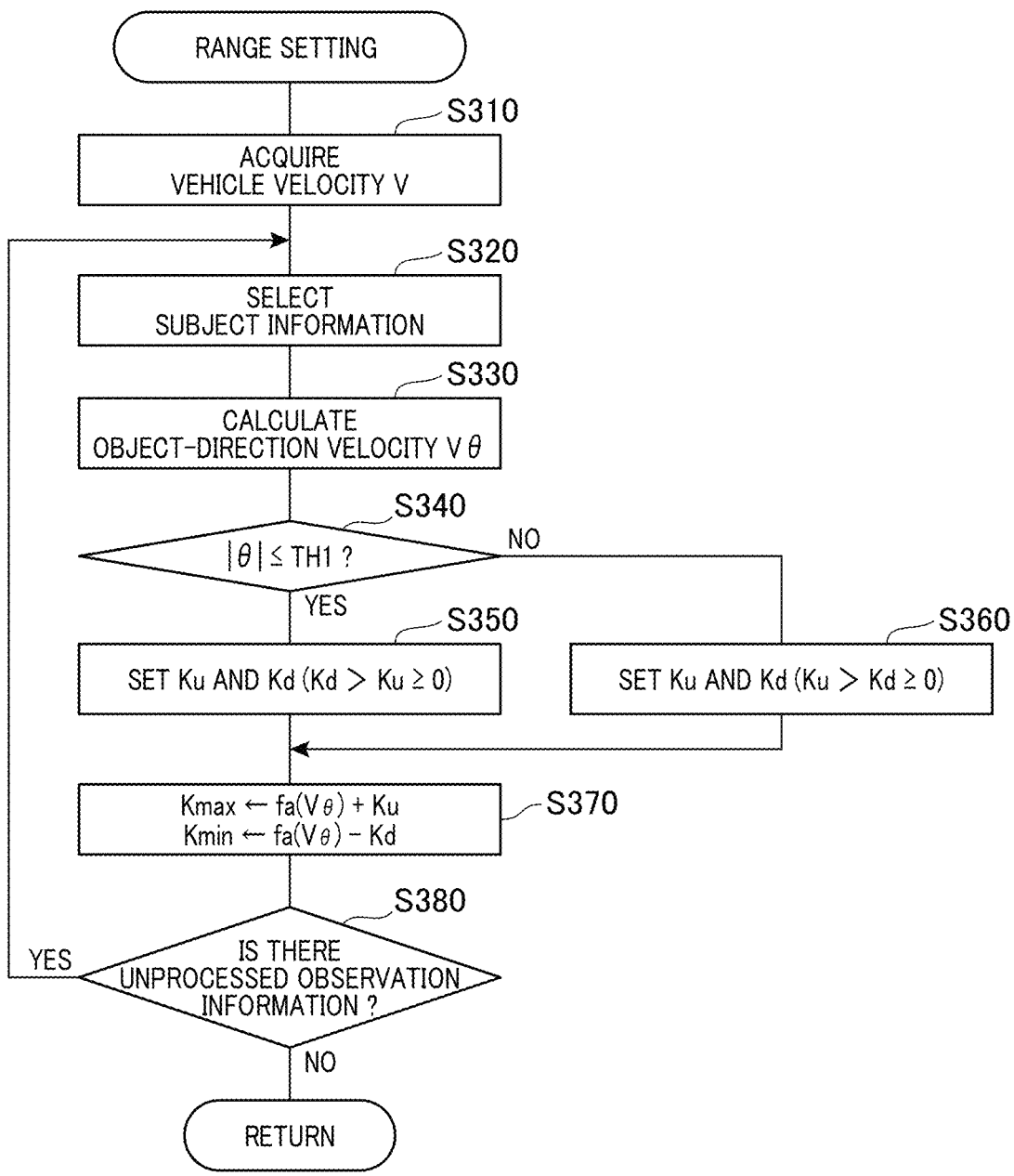
FIG. 7 is a flowchart of a range setting process.

The range setting process performed by the object tracking device 20 at S40 will now be described in detail with reference to the flowchart in FIG. 7.

Upon initiation of the range setting process, the object tracking device 20, at S310, acquires the vehicle velocity V from the sensor mounted to the vehicle 50.

At subsequent S320, the object tracking device 20 selects one of pieces of observation information calculated at S30, for which the step processes of S330 to S370 have not been performed, as subject information.

At subsequent S330, the object tracking device 20 calculates an object-direction velocity Vθ, which is a velocity component of the vehicle 50 in the direction indicated by the azimuth observation θ, according to the equation (2), based on the azimuth observation θ of the subject information and the vehicle velocity V acquired at S310. The object-direction velocity Vθ is a relative velocity observed when a stationary object is present in the direction indicated by the azimuth observation θ. The relative velocity is expressed as a negative value for the velocity in the approaching direction and as a positive value for the velocity in the receding direction.

$$V\theta = -V \cos \theta \qquad (2)$$

At subsequent S340, the object tracking device 20 determines whether the subject observation point, which is the observation point indicated by the subject information, is located in the travel direction of the vehicle 50, based on the azimuth observation θ of the subject information. Specifically, assuming that TH1=TH2=90 degrees where a first threshold is TH1 and a second threshold is TH2, if |θ|≤TH1, the subject observation point is determined to be located in the travel direction of the vehicle 50, and if |θ|>TH2, the subject observation point is determined to be located in the opposite direction from the travel direction of the vehicle 50.

If the subject observation point is determined to be located ahead of the vehicle 50 at S340, the object tracking device 20 proceeds to S350, and if the subject observation point is determined to be located behind the vehicle 50 at S340, the object tracking device 20 proceeds to S360.

At S350, the object tracking device 20 sets parameters Ku and Kd used for setting the folding range, and then proceeds to S370, where the parameters Ku and Kd are integer values that are set to satisfy the equation (3).

$$Kd > Ku \geq 0 \qquad (3)$$

At S360, the object tracking device 20 sets the parameters Ku and Kd used for setting the folding range, and then proceeds to S370, where the parameters Ku and Kd are integer values that are set to satisfy the equation (4).

$$Ku > Kd \geq 0 \qquad (4)$$

At S370, the object tracking device 20 calculates an upper limit Kmax of the number of foldings k that determines the upper limit of the folding range, and a lower limit Kmin of the number of foldings k that determines the lower limit of the folding range. Specifically, Kmax is calculated according to the equation (5), and Kmin is calculated according to the equation (6). The total number of unit ranges, P, from the unit range identified by k=Kmax to the unit range identified by k=Kmin, is set as the folding range.

$$K\max = fa(V\theta) + Ku \qquad (5)$$

$$K\min = fa(V\theta) - Kd \qquad (6)$$

$$P = K\max - K\min + 1 \qquad (7)$$

Here, fa(Vθ) is a function for calculating the number of foldings k corresponding to the unit range to which a velocity estimate closest to the object-direction velocity ye (hereinafter referred to as a closest estimate) belongs. For example, as illustrated in FIG. 4, it is assumed that the object-direction velocity Vθ, indicated by "○" in FIG. 4, is in the unit range corresponding to k=0. If the velocity estimate is calculated as indicated by the "x" mark in FIG. 4, the velocity estimate that exists in the unit range of k=0 is the closest estimate, and fa(Vθ)=0. If the velocity estimate is calculated as indicated by the "Δ" mark in FIG. 4, the velocity estimate present in the unit range of k=1 is the closest estimate, and fa(Vθ)=1.

The equations (5) and (6) mean that the folding range is set to extend from the unit range corresponding to the number of foldings k=fa(Vθ) to the positive side by Ku unit ranges and to the negative side by Kd unit ranges.

Here, the velocity estimate that is less than the closest estimate is referred to as an approaching estimate, and the velocity estimate that is greater than the closest estimate is referred to as a receding estimate. When the subject observation point is located ahead of the vehicle, Ku and Kd satisfy the equation (3). Therefore, the folding range is set such that more approach estimates are calculated. When the subject observation point is located behind the vehicle, Ku and Kd satisfy the equation (4). Therefore, the folding range is set such that more receding estimates are calculated.

At subsequent S380, the object tracking device 20 determines whether there is unprocessed observation information for the process steps of S320 to S370. If at S380 it is determined that there is such unprocessed observation information, the object tracking device 20 returns to S320. If at S370 it is determined that there is no such unprocessed observation information, the object tracking device 20 terminates the range setting process.

Returning to FIG. 5, at S50 following the range setting process of S40, the object tracking device 20 determines whether there is at least one unprocessed candidate information set for process steps S110 to S210 described below in the current processing cycle, among candidate information sets inherited from processing in the previous processing cycle. The candidate information and the candidate information sets will be described in detail at S90.

If at S50 it is determined that there is no unprocessed candidate information set, the object tracking device 20 proceeds to S60.

At S60, the object tracking device 20 determines whether there is at least one piece of unprocessed initial observation information among the pieces of observation information acquired at S30 in the current processing cycle, for which the process steps of S70 to S100 described below have not been performed. The initial observation information is unmatched observation information that has not been confirmed to have a historical connection with the candidate information. If at S60 it is determined that there is at least one piece of unprocessed initial observation information, the object tracking device 20 proceeds to S70. The observation points that are associated with the respective pieces of initial observation information are initial observation points.

At S70, the object tracking device 20 selects any one of the at least one piece of unprocessed initial observation information as subject information.

At subsequent S80, using the velocity observation Vob of the subject information and the folding range set up at S40, the object tracking device 20 calculates P velocity estimates Ves corresponding the Kmin$^{th}$ to the Kmax$^{th}$ velocity foldings. The P velocity estimates Ves are calculated according to the following the equation (8).

$$Ves = Vob + W \times M \qquad (8)$$

Here, W is a range width of the unit range and M is an integer such that Kmin≤M≤Kmax.

At subsequent S90, the object tracking device 20 calculates a velocity prediction (or predicted velocity) Vpr and a distance prediction (or predicted distance) Rpr for each of the P velocity estimates Ves calculated at S80 and thereby generates a candidate information set of new P pieces of candidate information. In the following, an object that is estimated to be present based on the candidate information is referred to as a candidate target. The velocity prediction Vpr is a prediction of velocity observation Vob in the next processing cycle. The distance prediction Rob is a a prediction of distance observation Rob in the next processing cycle.

Specifically, it is assumed that each of the candidate targets represented by the P pieces of candidate information belonging to the candidate information set moves in the direction indicated by the azimuth observation θ of the subject information while keeping the velocity estimation Ves calculated at S80. Therefore, for each of the P pieces of candidate information belonging to the same candidate information set, the velocity estimate Ves is taken as the velocity prediction Vpr, as expressed in the equation (9). Also, as expressed in the equation (10), the distance observation Rob plus a distance calculated by multiplying the velocity estimate Ves by the period of the processing cycle Tcy is the distance prediction Rpr.

$$Vpr=Ves \quad (9)$$

$$Rpr=Rob+Ves \times Tcy \quad (10)$$

Each of FIGS. 8 and 9 illustrates predicted positions in the processing cycle C2, which are calculated based on the initial observation information detected in the processing cycle C1. Each predicted position can be expressed using the distance prediction Rpr and the azimuth observation θ. FIG. 8 illustrates a case where the initial observation information indicates the object is located in the direction of travel of the vehicle 50 and the number of foldings is k=0, −1. FIG. 9 illustrates a case where the initial observation information indicates the object is located in the opposite direction from the direction of travel of the vehicle 50 and the number of foldings is k=0, 1.

At subsequent S100, the object tracking device 20 sets initial values of likelihood representing the certainty of the velocity estimates for the different velocity estimates Ves associated with the respective P pieces of candidate information, and returns to S60.

At S100, the object tracking device 20 may set the initial value such that the likelihood of the closest estimate is a maximum and the likelihood of the velocity estimate decreases as the velocity estimate is further away from the closest estimate. For example, FIG. 10 illustrates the case where the closest estimate corresponds to k=−1, and FIG. 11 illustrates the case where the closest estimate corresponds to k=1.

Figure 10:
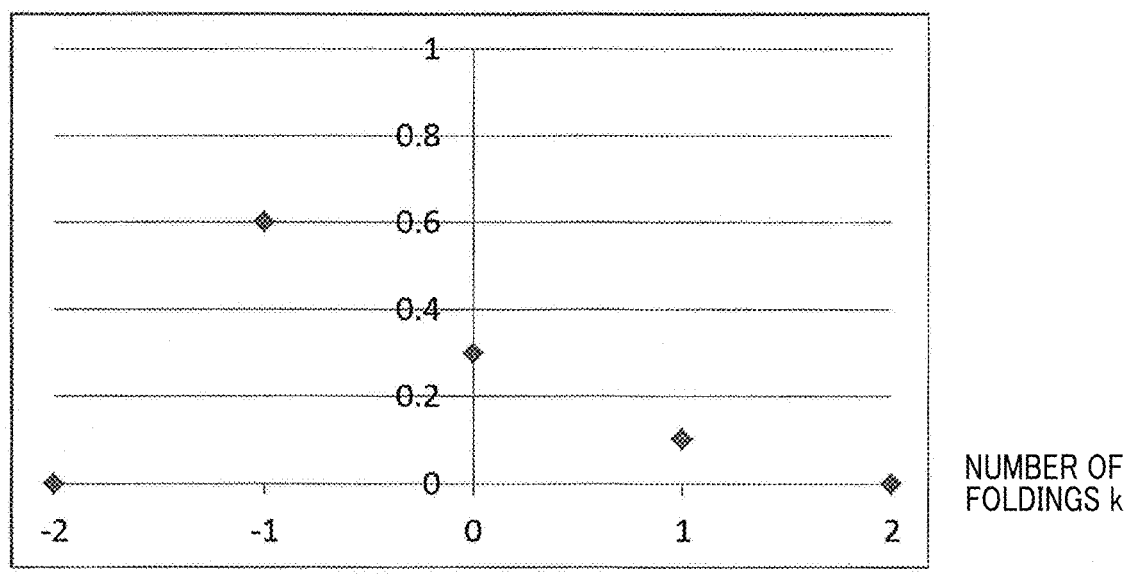
FIG. 10 is an example of initial values of likelihood in a case where the initial observation point is located in the direction of travel of the vehicle.
Figure 11:
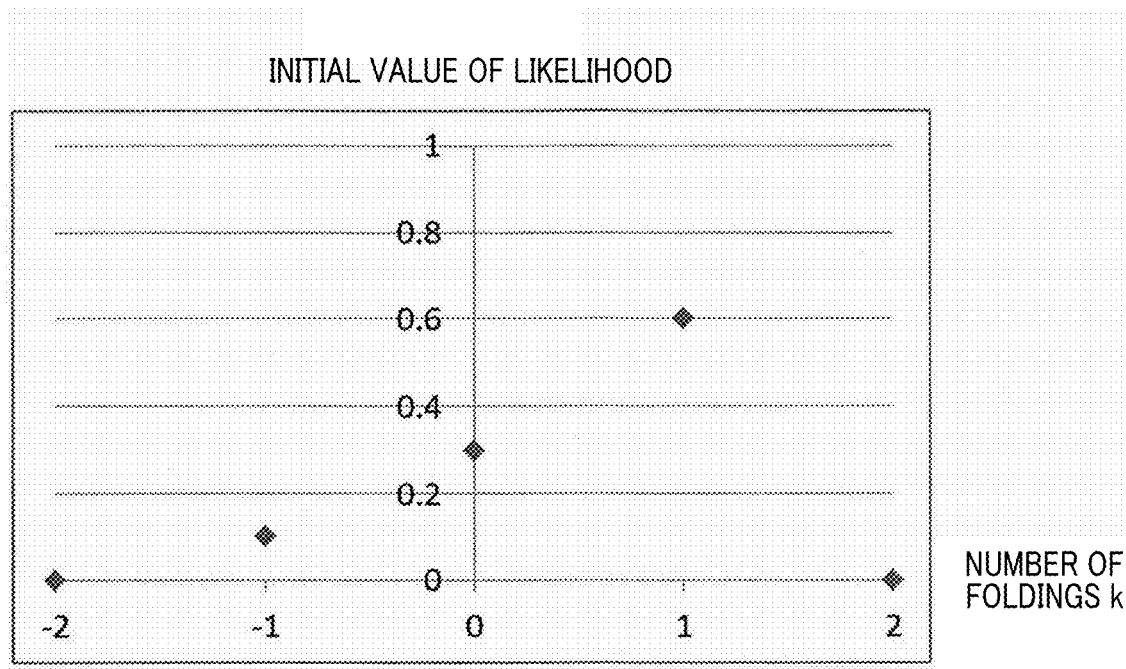
FIG. 11 is an example of initial values of likelihood in a case where the initial observation point is located in the opposite direction from the direction of travel of the vehicle.

When the azimuth observation θ of the subject information meets |θ|≤TH1, the initial value may be set such that the negative side total likelihood becomes greater than the positive side total likelihood, as illustrated in FIG. 10. Conversely, when the azimuth observation θ of the subject information meets is |θ|>TH2, the initial value may be set such that the positive-side total likelihood is greater than the negative-side total likelihood, as illustrated in FIG. 11. However, the negative side total likelihood is a sum of likelihoods assigned to the velocity estimates for each of which the number of foldings k is negative, and the positive side total likelihood is a sum of likelihoods assigned to the velocity estimates for each of which the number of foldings k is positive. Furthermore, the initial value of likelihood may be changed depending on the velocity V of the vehicle 50 and other factors.

If at S60 it is determined that there are no pieces of unprocessed initial observation information, the object tracking device 20 terminates the current processing cycle.

If at S50 it is determined that there is at least one unprocessed candidate information set, the object tracking device 20 proceeds to S110.

At S110, the object tracking device 20 selects one of the at least one unprocessed candidate information set as a subject candidate set.

At subsequent S120, the object tracking device 20 selects, from candidate information belonging to the subject candidate set, one piece of unprocessed candidate information for which the process steps S130 to S180 described below have not been performed, as candidate information of interest.

At subsequent S130, the object tracking device 20 calculates an evaluation value to evaluate the correspondence between each of pieces of observation information detected in the current processing cycle and the candidate information of interest. More specifically, the object tracking device 20 sets the evaluation value to a higher value as a difference between the velocity prediction Vpr of the candidate information of interest and the velocity observation Vob of the observation information, and a difference between the distance prediction Rpr of the candidate information of interest and the distance observation Rob of the observation information are both smaller. The higher the value of the evaluation value, the higher the correspondence.

Here, the observation information of interest refers to one piece of observation information, which is of interest. The object tracking device 20 first calculates a first difference, which is a difference between the velocity prediction Vpr of the candidate information of interest and the closest one of the observed velocity Vob of the observation information of interest and its folded values (hereinafter referred to as a selected velocity). The object tracking device 20 further calculates a second difference, which is a difference between the distance prediction value Rpr of the candidate information of interest and the distance observation Rob of the observation information of interest. Then, the object tracking device 20 calculates an evaluation value that is larger the smaller the simple or weighted sum of the first difference and the second difference. In the same way, the object tracking device 20 calculates the evaluation value for a combination of the candidate information of interest and each of all the pieces of observation information detected in the current processing cycle.

For example, in FIG. 8, a larger evaluation value is calculated when the observation information in processing cycle C2 is combined with the candidate information for k=−1 than when the observation information in processing cycle C2 is combined with the candidate information for k=0. Similarly, in FIG. 9, a larger evaluation value is calculated when the observation information in processing cycle C2 is combined with the candidate information for k=1 than when the observation information in processing cycle C2 is combined with the candidate information for k=0.

At subsequent S140, the object tracking device 20 determines whether there is any observation information matched with the candidate information of interest. More specifically, the observation information whose evaluation value calculated at S130 is a maximum and higher than a preset evaluation threshold is considered as observation information matched with the candidate information of interest.

If at S140 it is determined that there is some observation information matched with the candidate information of interest, i.e., if it is determined that there is observation information that has a historical connection with the candidate information of interest, then the object tracking device 20 proceeds to S150.

At S150, the object tracking device 20 calculates the velocity estimate Ves and the distance estimate Res of the candidate information of interest, and then proceeds to S170.

The velocity estimate Ves of the candidate information of interest is calculated by a weighted average of the velocity prediction Vpr of the candidate information of interest and the selected velocity Vos matched with the candidate information of interest (i.e., the velocity observation Vob or its folded value).

The distance estimate Res of the candidate information of interest is calculated according to the equation (11) based on the distance prediction Rpr of the candidate information of interest and the distance observation Rob matched with the candidate information of interest. α is a filter gain.

$$Res=Rpr+\alpha(Rob-Rpr) \quad (11)$$

The velocity estimate Ves and distance estimate Res of the candidate information of interest may be calculated using a Kalman filter or other methods.

If at S140 it is determined that there is no observation information matched with the candidate information of interest, i.e., there is no observation information that has a historical connection with the candidate information of interest, the object tracking device 20 proceeds to S160.

At S160, the object tracking device 20 calculates the velocity estimate Ves and the distance estimate Res of the candidate information of interest by performing an extrapolation process on the candidate information of interest, and then proceeds to the process of S170.

In the extrapolation process, the velocity estimate Ves of the candidate information of interest is calculated using the velocity prediction Vpr of the candidate information of interest as is, as shown in equation (12). The distance estimate Res of the candidate information of interest is calculated according to the equation (13) based on the distance estimate Rpr and the velocity prediction Vpr of the candidate information of interest.

$$Ves=Vpr \quad (12)$$

$$Res=Rpr+Vpr \times Tcy \quad (13)$$

If the extrapolation process is continuously performed on the candidate information of interest for a preset number of processing cycles, such candidate information of interest may be removed from the subject candidate set.

At S170, the object tracking device 20 calculates the velocity prediction Vpr and the distance prediction Rpr of the candidate information of interest in the next processing cycle.

As shown in the equation (14), the velocity estimate Ves calculated in the process of S150 or S160 is used as is for the velocity prediction Vpr of the candidate information of interest. The distance prediction Rpr of the candidate information of interest is calculated according to the equation (15) using the velocity estimate Ves and the distance estimate Res calculated in the process of S150 or S160.

$$Vpr=Ves \quad (14)$$

$$Rpr=Res+Ves \times Tcy \quad (15)$$

At subsequent S180, the object tracking device 20 updates the likelihood of the velocity estimate Ves for the candidate information of interest. More specifically, the likelihood is increased for the candidate information of interest for which matching has been established, and the likelihood is decreased for the candidate information of interest for which the extrapolation process has been performed. In addition, when increasing the likelihood, the amount of increase in the likelihood may be increased according to the evaluation value of the observation information matched with the candidate information of interest, such that the higher the evaluation value, the larger the increase in the likelihood. If the updated likelihood decreases to below a preset removal threshold, the candidate information of interest may be removed from the subject candidate set.

At subsequent S190, the object tracking device 20 determines whether the process steps S130 to S180 described above have already been performed for all candidate information belonging to the subject candidate set.

If at S190 it is determined that there is some candidate information for which the process steps S130 to S180 have not been performed, the object tracking device 20 returns to S120. If it is determined that the process steps S130 to S180 have been performed for all candidate information, the object tracking device 20 proceeds to the process of S200.

At S200, the object tracking device 20 determines whether there is any candidate information to be targeted, in the candidate information belonging to the subject candidate set. More specifically, the candidate information whose likelihood updated at S180 is the maximum and higher than a preset likelihood threshold is considered to be candidate information to be targeted.

If at S200 it is determined that there is no candidate information to be targeted, the object tracking device 20 returns to S50. If it is determined that there is some candidate information to be targeted, the object tracking device 20 proceeds to the process of S210.

At S210, the object tracking device 20 defines the candidate information to be targeted as target information of a target represented by the subject candidate set. That is, the velocity estimate Ves and the distance estimate Res of the candidate information to be targeted are defined as the velocity V and the distance R of the target, respectively. The candidate information that belongs to the subject candidate set, other than the candidate information to be targeted, is removed.

At subsequent S220, the object tracking device 20 outputs the target information including the velocity V and the distance R of the target determined at S210 to the driving assistance device 30, and returns to S50.

The driving assistance device 30 performs various driving assistance processes based on the target information provided by the object tracking device 20.

Figure 1B:
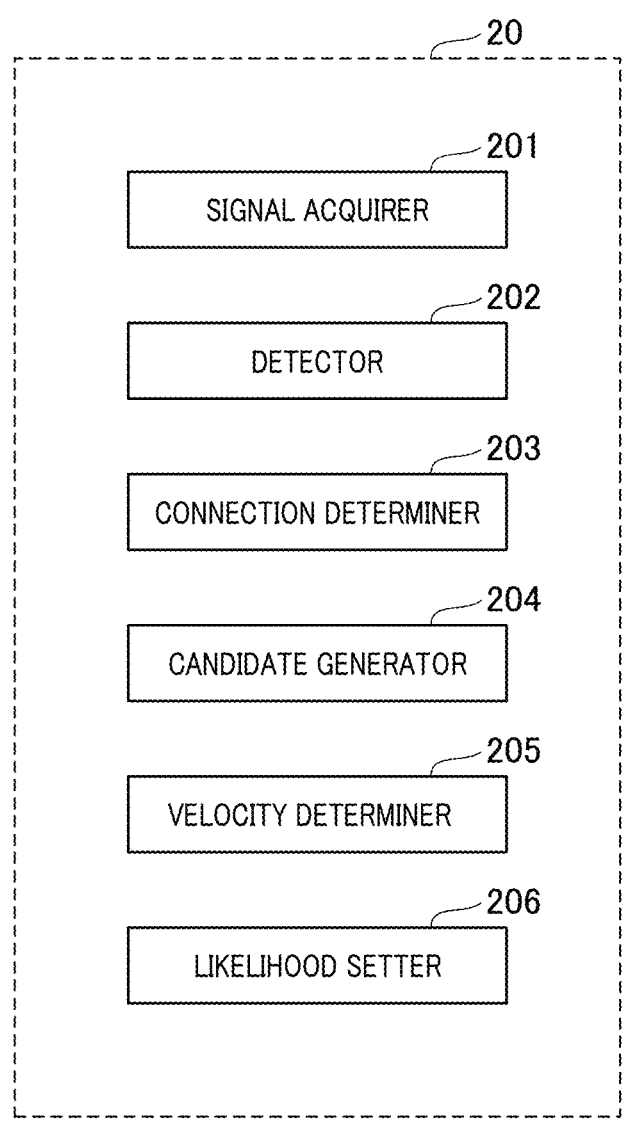
FIG. 1B is a functional block diagram of an object tracking device.

As illustrated in FIG. 1B, the object tracking device 20 includes, as functional blocks, a signal acquirer 201, a detector 202, a connection determiner 203, a candidate generator 204, a velocity determiner 205, and a likelihood setter 206. The functions of these functional blocks may be implemented by the CPU 21 executing computer programs stored in the memory 22. In the above process, the process step S10 corresponds to the signal acquirer 201, the process steps S20 to S30 correspond to the detector 202, the process steps S40 and S60 to S90 correspond to the candidate generator 204, the process step S100 corresponds to the likelihood setter 206, the process steps S130 to S140 correspond to the connection determiner 203, and the process steps S180 to S210 correspond to the velocity determiner 205.

3. Example Operations

Figure 12:
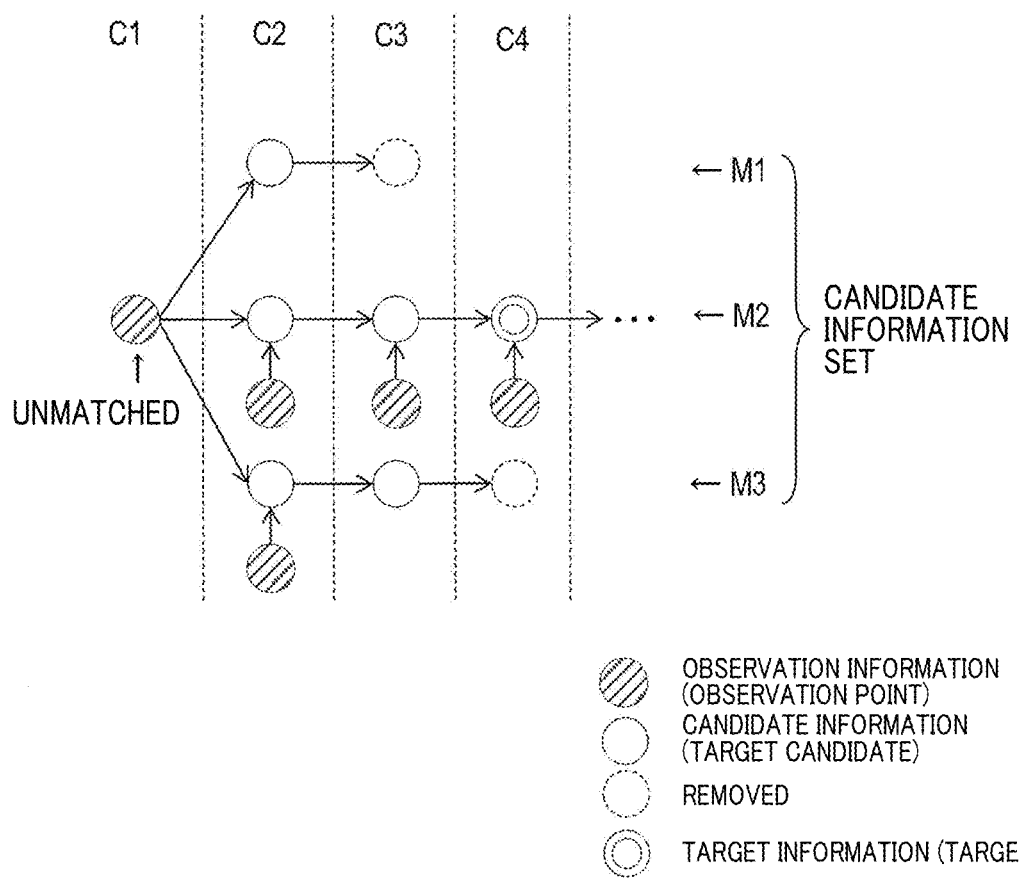
FIG. 12 is an illustration of a removal and targeting process for three candidate targets generated from one observation point.

The sequence of operations from generation of candidate information from the initial observation information to targeting will now be described with reference to FIG. 12.

When the initial observation information is detected in the processing cycle C1, P pieces of candidate information M1 to MP with different velocities are generated every k foldings, according to the folding range set at S40 for that initial observation information. FIG. 12 illustrates the case of P=3.

In the processing cycle C2, for each of the three pieces of candidate information M1 to M3 belonging to the same candidate information set generated in the processing cycle C1, the evaluation value of correspondence between the candidate information and the observation information detected in the processing cycle C2 is calculated, and matching of the candidate information with the observation information is performed based on the evaluation value. In FIG. 12, since there is no observation information matched with the candidate information M1, the velocity estimate Ves and the distance estimate Res are calculated by extrapolation. For each of the pieces of candidate information M2 and M3, since there is some observation information matched therewith, the velocity estimate Ves and the distance estimate Res are calculated based on the candidate information and the observation information matched with the candidate information. Furthermore, the likelihood of the velocity estimate Ves of the piece of candidate information M1 decreases, and the likelihoods of the pieces of candidate information M2 and M3 increase. At this stage, it is assumed that none of the likelihoods have exceeded the likelihood threshold.

In the processing cycle C3, matching of the candidate information M1 to M3 inherited from the processing cycle C2 with the observation information is performed in the same way as in the case of the processing cycle C2. For each of the pieces of candidate information M1 and M3 that are not matched with any observation information, the velocity estimate Ves and the distance estimate Res are calculated by extrapolation and updated such that the likelihood decreases. At this stage, the piece of candidate information M1 is removed when it satisfies the removal condition that the likelihood exceeds the removal threshold or that the extrapolation process has been performed for a preset number of consecutive times. For the piece of candidate information M2 matched with some observation information, the velocity estimate Ves and the distance estimate Res are calculated and updated such that the likelihood increases. At this stage, it is assumed that none of the likelihoods exceed the likelihood threshold.

In the processing cycle C4, matching of each of the pieces of candidate information M2 and M3 inherited from processing cycle C3 with the observation information is performed. The piece of candidate information M3 that is not matched with any observation information is processed in the same way as the candidate information M1 in the processing cycle C3. For the piece of candidate information M2 that is matched with some observation information, the velocity estimate Ves and the distance estimate Res are calculated and updated such that the likelihood increases. As a result of the update, when the likelihood exceeds the likelihood threshold, the piece of candidate information M2 is targeted as there is no candidate information, other than the piece of candidate information M2, whose likelihood exceeds the likelihood threshold.

4. Advantages

The embodiment described above in detail provides the following advantages.

(4a) In the object tracking system 20, the number of foldings k used to calculate the velocity estimates Ves is set such that the closest estimate to the object-direction velocity is included in the folding range when the observation point is assumed to be a stationary object. The number of foldings k is set such that when the azimuth observation $\theta$ of the observation point meets $|\theta| \leq TH1$, the folding range more extends from the closest estimate to the negative side than to the positive side, and when $|\theta| > TH2$, the folding range more extends from the closest estimate to the positive side than to the negative side.

As a result, in the object tracking device 20, the velocity range is set to an appropriate range based on the closest estimate, according to the position of the observation point relative to the vehicle 50. This enables the object tracking system 20 to suppress an increase in calculation load during the object tracking process taking into account the velocity foldings and improve the accuracy of velocity estimation.

(4b) In the object tracking device 20, the initial value of the likelihood of the velocity estimate is set such that the negative-side total likelihood is higher than the positive-side total likelihood when the azimuth observation $\theta$ of the initial observation point meets $|\theta| \leq TH1$, and the positive-side total likelihood is higher than the negative-side total likelihood when the azimuth observation $\theta$ of the initial observation point meets $|\theta| > TH2$. In addition, in the object tracking system 20, the initial value of the likelihood of the velocity estimate is set such that the likelihood of the closest estimate is the maximum and the likelihood of the velocity estimate becomes lower the further away from the closest estimate the velocity estimate is.

Therefore, with the object tracking device 20, the initial value of the likelihood is set such that a hypothesis of the velocity estimate having a relative velocity closer to that of the stationary object is more readily adopted, thus improving the estimation accuracy of the velocity of the object having a relative velocity closer to the stationary object. That is, a vehicle approaching the vehicle 50 has a lower relative velocity than a stationary object, and a vehicle moving away from the vehicle 50 has a higher relative velocity than a stationary object. This is because the relative velocities of moving objects are distributed around the relative velocity of the stationary object.

Other Embodiments

Although the specific embodiment of the present disclosure has been described above, the present disclosure is not limited to the embodiment described above, and can be implemented in various variations.

(5a) In the above embodiment, the number of foldings Kmin and the number of foldings Kmax, which define the folding range, and the initial value of the likelihood of the velocity estimate Ves are both variably set depending on the position of the observation point relative to the vehicle 50, but the present disclosure is not limited thereto. For example, only the number of foldings Kmin and the number of foldings Kmax may be variably set, and the initial value of the likelihood of the velocity estimate Ves may be fixed. Alternatively, only the initial value of the likelihood of the velocity estimate Ves may be variably set, and the number of foldings Kmin and the number of foldings Kmax may be fixed.

(5b) In the above embodiment, the first threshold TH1 and the second threshold TH2 used for determining the position of the observation point relative to the vehicle 50 are set to TH1=TH2=90°, but the present disclosure is not limited thereto. For example, the first threshold TH1 may be set arbitrarily within the range meeting 0°<TH1≤90°, and the second threshold TH2 may be set arbitrarily within the range meeting 90°≤TH2<180°. When TH1≠TH2, at least one of the number of foldings Kmin, the number of foldings Kmax, and the initial value of the likelihood may be set to be different in the case of TH1<|θ|<TH2 than in the case of |θ|≤TH1 or |θ|>TH2.

(5c) In the above embodiment, the radar device 10 is a FCM millimeter-wave radar, but the present disclosure is not limited thereto. For example, the radar device 10 may be a pulsed millimeter-wave radar that transmits pulse signals every preset repetition period.

(5d) In the above-described embodiments and modifications, the object tracking device 20 and its method described in the present disclosure may be implemented by a dedicated computer including a processor and a memory programmed to execute one or more functions embodied by computer programs. Alternatively, the object tracking device 20 and its method described in the present disclosure may be implemented by a dedicated computer including a processor formed of one or more dedicated hardware logic circuits, or may be implemented by one or more dedicated computers including a combination of a processor and a memory programmed to execute one or more functions and a processor formed of one or more dedicated hardware logic circuits. The computer programs may be stored, as instructions to be executed by a computer, in a non-transitory, tangible computer-readable storage medium. The technique for implementing the functions of each part included in the object tracking device 20 does not necessarily include software, and all of its functions may be implemented using one or more pieces of hardware.

(5e) The plurality of functions possessed by one component in the above embodiment may be implemented by a plurality of components, or one function possessed by one component may be implemented by a plurality of components. A plurality of functions possessed by a plurality of components may be implemented by a single component, or a single function implemented by a plurality of components may be implemented by a single component. In addition, some of the components of the above embodiment may be omitted. At least some of the configurations of the above embodiments may be added to or replaced with other configurations of the above embodiments.

(5f) In addition to the object tracking device 20 described above, the present disclosure can be implemented in various forms, such as a system comprising the object tracking device as a component, a program for making a computer function as the object tracking device 20, a non-transitory, tangible storage medium, such as a semiconductor memory, on which this program is recorded, and a velocity estimation method.

What is claimed is:

1. An object tracking device comprising:
a signal acquirer configured to acquire a signal every preset processing cycle from a radar device that is mounted to a moving object and uses a modulation scheme for detecting a velocity from a phase change of the signal;
a detector configured to detect, from the signal acquired by the signal acquirer, a relative velocity and an azimuth of each of observation points that reflected a transmitted wave;
a connection determiner configured to determine, for each of current observation points which are the observation points detected by the detector in a current processing cycle, whether there is a historical connection between the current observation point and each of candidate targets generated based on the observation point detected until a previous processing cycle;
a candidate generator configured to, given a number of foldings Kmin and a number of foldings Kmax that are integers, and P=Kmax−Kmin+1 that defines a range of foldings of velocity by phase rotation from $Kmin^{th}$ to $Kmax^{th}$ foldings, calculate P velocity estimates for each of initial observation points that are the current observation points determined by the connection determiner to have no historical connection with the candidate targets, and generate, from the initial observation point, a set of candidate targets having different relative velocity estimates; and
a velocity determiner configured to, for each set of candidate targets generated by the candidate generator, select one of the candidate targets belonging to the set of candidate targets, based on at least a result of determination made by the connection determiner, thereby determining the velocity of a target associated with the initial observation point,
wherein the relative velocity of the observation point is set such that the relative velocity in a direction of approaching the moving object is negative and the relative velocity in a direction of moving away from the moving object is positive, and
the candidate generator is configured to set, for each of the observation points, the number of foldings Kmin and the number of foldings Kmax such that Kmin<0 and |Kmin|>|Kmax| when an absolute value of an observation angle representing a direction of the observation point relative to the direction of travel of the moving object is equal to or less than a preset first threshold value, and Kmax>0 and |Kmin|<|Kmax| when the absolute value of the observation angle is greater than a second threshold that is set equal to or greater than the first threshold value.

2. The object tracking device according to claim 1, further comprising
a likelihood setter configured to set, for each set of candidate targets generated by the candidate generator, an initial value of likelihood representing certainty for each of the velocity estimates of the respective candidate targets belonging to the set of candidate targets,
wherein the velocity determiner is configured to update the likelihoods according to the result of determination made by the connection determiner and select the one of the candidate targets according to the updated likelihoods,
the likelihood setter is configured to, given that a sum of the likelihoods assigned to the velocity estimates for which the number of foldings is negative is a negative-side total likelihood and a sum of the likelihoods assigned to the velocity estimates for which the number of foldings is positive is a positive-side total likelihood, set the initial values of the likelihoods such that when the absolute value of the observation angle is equal to or less than the first threshold value, the negative-side total likelihood is higher than the positive-side total likelihood, and when the absolute value of the observation angle is greater than the second threshold, the positive-side total likelihood is higher than the negative-side total likelihood.

3. The object tracking device according to claim 2, wherein
the likelihood setter is configured to set the initial values of the likelihood such that the likelihood of a closest estimate that is the velocity estimate closest to an object-direction velocity which is a velocity component of the moving object along a direction indicated by the observation angle, is maximized.

4. The object tracking device according to claim 1, wherein
the candidate generator is configured to set the number of foldings Kmin and the number of foldings Kmax such that a closest estimate that is the velocity estimate closest to an object-direction velocity which is a velocity component of the moving object along a direction indicated by the observation angle is included in a folding range that is a velocity range defined by the number of foldings Kmin and the number of foldings Kmax.

5. The object tracking device according to claim 4, wherein
the candidate generator is configured to set the number of foldings Kmin and the number of foldings Kmax such that when the absolute value of the observation angle is equal to or less than the first threshold, the folding range more extends below the closest estimate than above the closest estimate, and when the absolute value of the observation angle is greater than the second threshold, the folding range more extends above the closest estimate than below the closest estimate.

6. The object tracking device according to claim 1, wherein
the first threshold is set to a value equal to or less than 90 degrees.

7. The object tracking device according to claim 1, wherein
the second threshold is set to a value equal to or greater than 90 degrees.

8. An object tracking device comprising:
a signal acquirer configured to acquire a signal every preset processing cycle from a radar device that is mounted to a moving object and uses a modulation scheme for detecting a velocity from a phase change of the signal;
a detector configured to detect, from the signal acquired by the signal acquirer, a relative velocity and an azimuth of each of observation points that reflected a transmitted wave;
a connection determiner configured to determine, for each of current observation points which are the observation points detected by the detector in a current processing cycle, whether there is a historical connection between the current observation point and each of candidate targets generated based on the observation point detected until a previous processing cycle;
a candidate generator configured to, given a number of foldings Kmin and a number of foldings Kmax that are integers, and P=Kmax−Kmin+1 that defines a range of foldings of velocity by phase rotation from $Kmin^{th}$ to $Kmax^{th}$ foldings, calculate P velocity estimates for each of initial observation points that are the current observation points determined by the connection determiner to have no historical connection with the candidate targets, and generate, from the initial observation point, a set of candidate targets having different relative velocity estimates;
a likelihood setter configured to set, for each set of candidate targets generated by the candidate generator, an initial value of likelihood representing certainty for each of the velocity estimates of the respective candidate targets belonging to the set of candidate targets; and
a velocity determiner configured to, for each set of candidate targets generated by the candidate generator, update the likelihoods based on a result of determination made by the connection determiner, and select one of the candidate targets belonging to the set of candidate targets based on at least the likelihoods, thereby determining the velocity of a target associated with the initial observation point,
wherein the relative velocity of the observation point is set such that the velocity in the direction of approaching the moving object is negative and the velocity in the direction of separation from the moving object is positive,
the velocity determiner is configured to update the likelihoods according to the result of determination made by the connection determiner and select the one of the candidate targets according to the updated likelihoods, and
the likelihood setter is configured to, given that a sum of the likelihoods assigned to the velocity estimates for which the number of foldings is negative is a negative-side total likelihood and a sum of the likelihoods assigned to the velocity estimates for which the number of foldings is positive is a positive-side total likelihood, set the initial values of the likelihoods such that when an absolute value of an observation angle representing a direction of the observation point relative to the direction of travel of the moving object is equal to or less than a preset first threshold value, the negative-side total likelihood is higher than the positive-side total likelihood, and when the absolute value of the observation angle is greater than a second threshold that is set equal to or greater than the first threshold value, the positive-side total likelihood is higher than the negative-side total likelihood.

* * * * *